(12) United States Patent
Nishino (10) Patent No.: US 7,719,950 B2
(45) Date of Patent: May 18, 2010

(54) DISK DRIVE APPARATUS AND METHOD FOR ADJUSTING FOCUS BIAS AND SPHERICAL ABERRATION CORRECTION VALUE

(75) Inventor: Masatoshi Nishino, Chiba (JP)

(73) Assignee: Sony NEC Optiarc Inc., Tokyo (JP)

( * ) Notice: Subject to any disclaimer, the term of this patent is extended or adjusted under 35 U.S.C. 154(b) by 433 days.

(21) Appl. No.: 11/849,520

(22) Filed: Sep. 4, 2007

(65) Prior Publication Data
US 2008/0068951 A1 Mar. 20, 2008

(30) Foreign Application Priority Data
Sep. 14, 2006 (JP) .................... P2006-249543

(51) Int. Cl.
G11B 7/00 (2006.01)
(52) U.S. Cl. .................... 369/112.23; 369/112.02; 369/44.23; 369/44.32; 369/53.35
(58) Field of Classification Search .................... None
See application file for complete search history.

(56) References Cited

U.S. PATENT DOCUMENTS 6,813,229 B1 * 11/2004 Gotou et al. ............. 369/44.37
7,542,398 B2 * 6/2009 Nishi .................... 369/112.02

FOREIGN PATENT DOCUMENTS

| JP | 7-201059 | 8/1995 |
| JP | 2001-236660 | 8/2001 |
| JP | 2003-233917 | 8/2003 |
| JP | 2004-241081 | 8/2004 |
| JP | 2005-267800 | 9/2005 |

OTHER PUBLICATIONS

U.S. Appl. No. 11/856,407, filed Sep. 17, 2007, Nishino.

* cited by examiner

Primary Examiner—Muhammad N. Edun
(74) Attorney, Agent, or Firm—Oblon, Spivak, McClelland, Maier & Neustadt, L.L.P.

(57) ABSTRACT

A disk drive apparatus includes: head means for performing laser irradiation to and detection of reflected light from an optical disk recording medium and having a focus bias mechanism and a spherical aberration correction mechanism; focus bias means for driving the focus bias mechanism to add a focus bias to a focus servo loop; spherical aberration correction means for driving the spherical aberration correction mechanism based on a spherical aberration correction value; evaluation value creating means for creating an evaluation value based on reflected light information obtained by the head means; adjustment means for adjusting the focus bias and the spherical aberration correction value; and control means for determining whether data is written on at least one track of the tracks adjacent to an adjustment use range on the recording medium and controlling an adjustment operation on the focus bias and the spherical aberration correction value by the adjustment means based on the determination result.

6 Claims, 7 Drawing Sheets

<Per-write Area>

| 7F00 | 7F01 | 7F02 | 7F03 | 7F04 | 7F05 | 7F06 | 7F07 |
|------|------|------|------|------|------|------|------|
| 7F08 | 7F09 | 7F0A | 7F0B | 7F0C | 7F0D | 7F0E | 7F0F |
| 7F10 | 7F11 | 7F12 | 7F13 | 7F14 | 7F15 | 7F16 | 7F17 |
| 7F18 | 7F19 | 7F1A | 7F1B | 7F1C | 7F1D | 7F1E | 7F1F |

DISK DRIVE APPARATUS AND METHOD FOR ADJUSTING FOCUS BIAS AND SPHERICAL ABERRATION CORRECTION VALUE

CROSS REFERENCES TO RELATED APPLICATIONS

The present invention contains subject matter related to Japanese Patent Application JP 2006-249543 filed in the Japanese Patent Office on Sep. 14, 2006, the entire contents of which being incorporated herein by reference.

BACKGROUND OF THE INVENTION

1. Field of the Invention

The present invention relates to a disk drive apparatus, which at least reads signals from an optical disk recording medium, and a method for adjusting a focus bias and a spherical aberration correction value.

2. Description of the Related Art

The technologies for writing/reading digital data may include a data recording technology by using an optical disk (including a magnetooptical disk), such as a CD (Compact Disk), an MD (Mini-Disk) and a DVD (Digital Versatile Disk), as a recording medium.

There are a read-only optical disk as known as a CD, a CD-ROM and a DVD-ROM and an optical disk on which user data can be written as known as an MD, a CD-R, a CD-RW, a DVD-R, a DVD-RW, a DVD+R, a DVD+RW and a DVD-RAM. Data can be written on the writable optical disk by applying a magnetooptical recording scheme, a phase-change recording scheme, a dye film change recording scheme and so on to allow recording data. The dye film change recording scheme may be also called "write-once recording" and is suitable for the application of data saving since data writing is allowed only once but rewriting is not allowed. On the other hand, the magnetooptical recording scheme and phase-change recording scheme allow data rewriting and may be applied for applications including recording contents data of music, video images, games, application programs and so on.

Furthermore, in recent years, a high density optical disk called "BLU-RAY DISC®" has been developed, and the capacity has been increased.

A high density disk such as "BLU-RAY DISC®" has a disk structure having a cover layer of about 0.1 mm in the direction of the thickness of the disk and writes/reads a phase change mark under the condition of the combination of laser (so-called blue laser) 405 nm wavelength and an objective lens with an NA (numerical aperture) of 0.85.

The recording capacity may be about 25 GB (gigabytes) on a disk 12 cm in diameter. The two-layer structure, for example, of the recording layer may allow the capacity of about 50 GB, which is the double.

By the way, as publicly known, a focus servo operation that controls the focal position of laser light on a disk recording surface and a tracking servo operation that controls laser light to trace a track (that is, a track by a pit array or a groove) on a disk are performed in an optical disk apparatus that writes/reads to/from an optical disk.

Then, with respect for the focus servo, it is known that applying a proper focus bias to a focus loop may be required for proper writing/reading and servo operations.

A high density disk may require spherical aberration correction in order to address the thickness error of the cover layer thereof and support the recording layer of the multi-layered structure. For example, those having a spherical aberration correction mechanism employing an expander or a liquid crystal element within an optical pickup have been developed.

A writable optical disk apparatus (recording/playing apparatus) including a high NA lens such as the "BLU-RAY DISK®" in particular may require the automatic adjustment of the focus bias and spherical aberration correction since the margins of the focus bias/spherical aberration correction are relatively narrow.

The method for adjusting a focus bias and a spherical aberration correction value is disclosed in JP-A-2004-241081 and JP-A-2003-233917 (Patent Documents 1 and 2).

SUMMARY OF THE INVENTION

A method for adjusting a focus bias and a spherical aberration correction value in the past obtains jitter values occurring when the focus bias and spherical aberration correction value are changed in the predetermined adjustment use range on a disk and adjusts to the focus bias and spherical aberration correction value when the jitter value is minimum, for example.

Figure 7A:
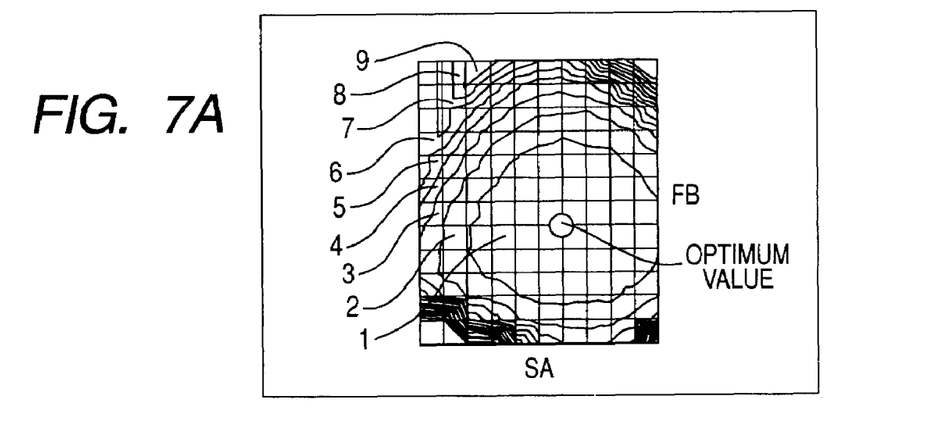
FIGS. 7A to 7C are characteristic diagrams showing jitter values by contour lines with changes in focus bias and spherical aberration correction value.
Figure 7B:
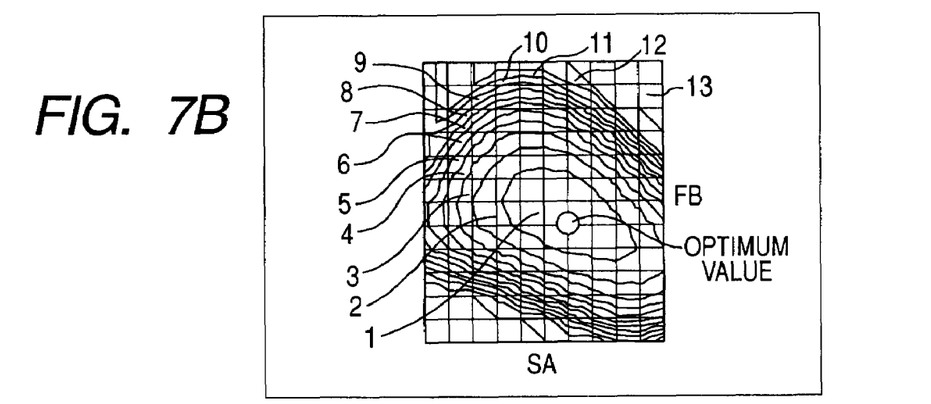
Figure 7C:
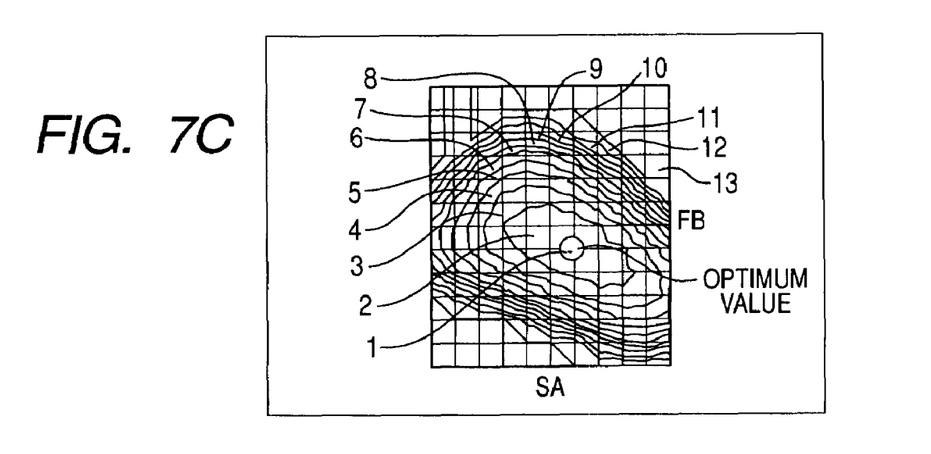

The characteristic diagrams shown in FIGS. 7A, 7B and 7C are characteristic diagrams of jitter values for changes in focus bias and spherical aberration correction values. In the characteristic diagrams, the vertical axis indicates focus biases, and the horizontal axis indicates spherical aberration correction values. The contour lines indicate jitter values. As the number decreases in the figures, the jitter value decreases.

FIG. 7A is a characteristic diagram when data is not written on both tracks adjacent to the adjustment use range. FIG. 7B is a characteristic diagram when data is written on one track adjacent to the adjustment use range. FIG. 7C is a characteristic diagram when data is written on both tracks adjacent to the adjustment use range.

Comparing the three characteristic diagrams, the margin of the jitter values for focus biases and spherical aberration correction values tends to be relatively wide when data is not written on the tracks on both sides. On the other hand, the margin of the jitter values for focus biases and spherical aberration correction values tends to be relatively narrow when data is written on the track on one side or the tracks on both sides.

From the characteristic diagrams, the characteristic of the jitter value depends on the presence of recording of data around the adjustment use range to be read for obtaining a jitter value for adjustment. Therefore, the precision for adjustment may possibly lack when the focus bias and spherical aberration correction value are adjusted simply based on the read data in a predetermined adjustment use range.

Accordingly, it is desirable to highly precisely adjust a focus bias and a spherical aberration correction range.

According to an embodiment of the invention, there is provided a disk drive apparatus including head means for performing laser irradiation to and detection of reflected light from an optical disk recording medium in order to read data and having a focus bias mechanism for laser light and a spherical aberration correction mechanism, focus bias means for driving the focus bias mechanism to add a focus bias to a focus servo loop, spherical aberration correction means for driving the spherical aberration correction mechanism based on a spherical aberration correction value to perform spherical aberration correction, evaluation value creating means for creating an evaluation value functioning as an indicator of the quality of read signals based on reflected light information obtained by the head means, adjustment means for adjusting the focus bias and the spherical aberration correction value to optimum values based on the evaluation value created by the evaluation value creating means, and control means for determining whether data is written on at least one track of the tracks adjacent to an adjustment use range on the optical disk recording medium or not based on the reflected light information obtained by the head means and controlling an adjustment operation on the focus bias and the spherical aberration correction value by the adjustment means based on the determination result.

According to the embodiment of the invention, whether data is written on at least one track of the tracks adjacent to an adjustment use range or not is determined, and an adjustment operation on the focus bias and the spherical aberration correction value by the adjustment means is controlled based on the determination result. Thus, the adjustment on the focus bias and spherical aberration correction value can be performed only when data is written on at least one of tracks adjacent to an adjustment use range.

Thus, the adjustment with high precision can be performed by adjusting a focus bias and a spherical aberration correction value under the condition that the margin of the jitter values for the focus biases and spherical aberration correction values is narrow since, according to the embodiment of the invention, the focus bias and spherical aberration correction value are adjusted only when data is written on at least one of the tracks adjacent to an adjustment use range.

DESCRIPTION OF THE PREFERRED EMBODIMENTS

The best mode for embodying the invention (which will be called embodiment, hereinafter) will be described below.

Figure 1:
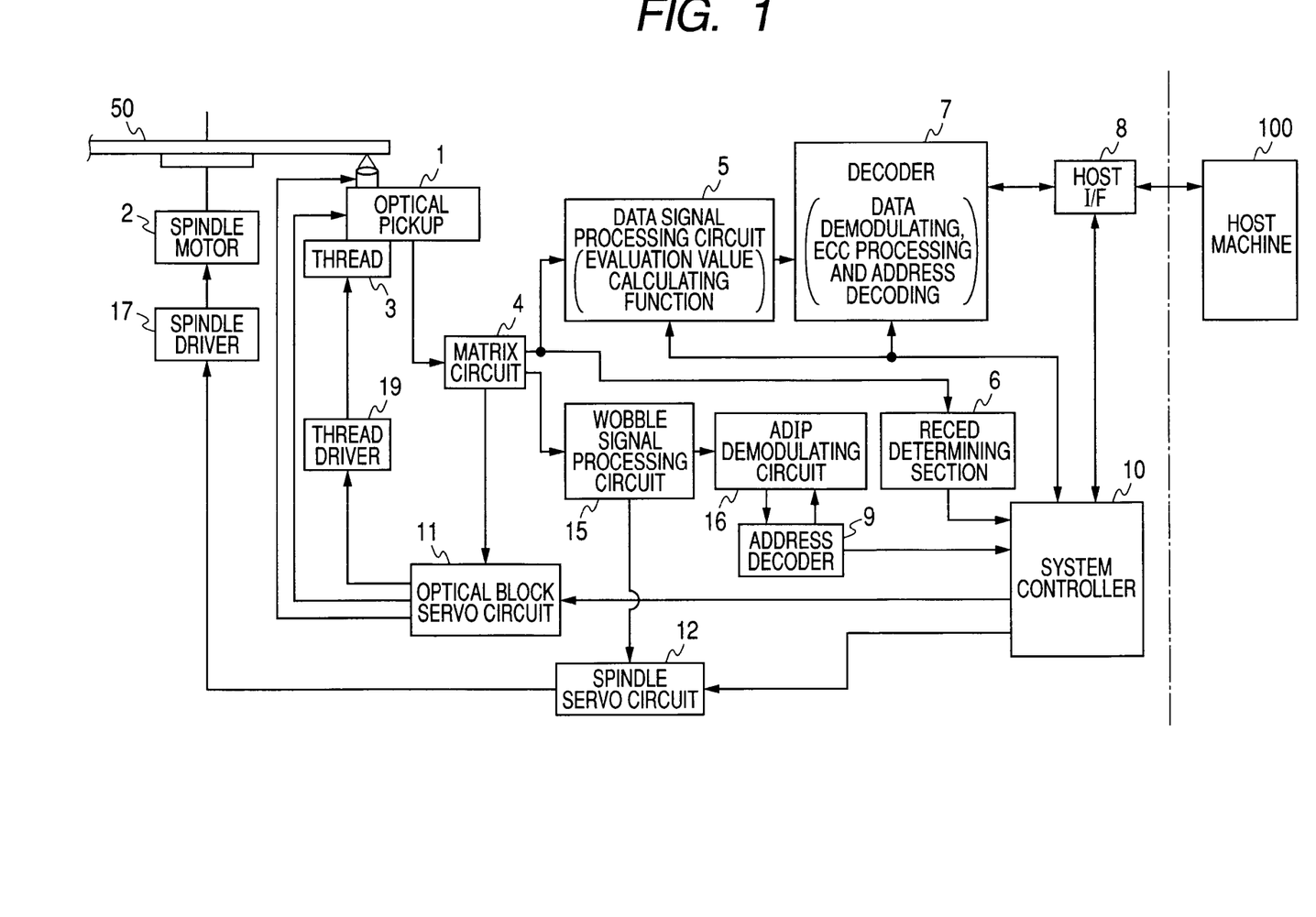
FIG. 1 is a block diagram showing an internal construction of a disk drive apparatus according to an embodiment of the invention.

FIG. 1 is a block diagram showing a construction of a disk drive apparatus according to an embodiment of the invention.

First of all, a disk 50 is an optical disk (writable disk) on which data is recorded by a phase-change scheme. Grooves wobble on the disk 50, and the grooves function as recording tracks. Address information as so-called ADIP (Address in Pregroove) information is embedded by the wobbling of the grooves.

The disk 50 may be a writable disk as described above or a ROM disk, but the disk drive apparatus according to this embodiment is a read-only apparatus.

The operations according to the embodiment, which will be described later, are to be performed on a writable disk as the disk 50.

The disk 50 is mounted on a turntable, not shown, when installed in a disk drive apparatus and is rotatably driven at a constant linear velocity (CLV) by a spindle motor 2 in a reading operation.

In a reading operation, information at a mark (pit) recorded on a track on the disk 50 is read by an optical pickup (optical head) 1.

The physical information of the disk 50, for example, as read-only management information may be recorded by an emboss pit or a wobbling groove on the disk 50, and the information is also read by the optical pickup 1.

The optical pickup 1 internally contains a laser diode functioning as a laser light source, a photodetector for detecting reflected light, an objective lens, which is the output end of the laser light, and an optical system that irradiates laser light to a disk recording surface through an objective lens and guides the reflected light to the photodetector. The laser diode outputs so-called blue laser 405 nm wavelength, for example. The NA (numerical aperture) of the optical system is 0.85.

The objective lens within the optical pickup 1 is held movably in the tracking direction and focus direction by a biaxial mechanism.

The entire optical pickup 1 is movable in the direction of the radius of a disk by a thread mechanism 3.

The reflected light information from the disk 50 is detected by a photodetector, is converted to an electric signal in accordance with the amount of received light and is supplied to a matrix circuit 4.

The matrix circuit 4 includes a current-voltage converting circuit and a matrix computing/amplifying circuit for output current from multiple photoreceptors functioning as photodetectors and generates necessary signals for matrix computing processing.

For example, the matrix circuit 4 may generate an RF signal (read data signal) corresponding to read data, a focus error signal FE for servo control and a tracking error signal TE.

The matrix circuit 4 further generates a push-pull signal as a signal relating to the wobbling of a groove, that is, a signal for detecting the wobbling.

The matrix circuit 4 outputs a read data signal (RF signal), a focus error signal FE and a tracking error signal TE and a push-pull signal to a data signal processing circuit 5 and an RECD determining section 6, an optical block servo circuit 11, and a wobble signal processing circuit 15, respectively.

The data signal processing circuit 5 performs binarization processing on a read data signal and supplies the resulting binary data string to a subsequent decoder section 7.

The data signal processing circuit 5 performs A/D converting processing on an RF signal, a recovery clock generating signal by PLL, PR (Partial Response) equalization processing, and Viterbi decoding (maximum likelihood decoding). In other words, the data signal processing circuit 5 obtains a binary data string by performing a partial response maximum likelihood decoding processing (PRML detection: Partial Response Maximum Likelihood detection).

The data signal processing circuit 5 in the case of this embodiment in particular has an evaluation value calculating function as shown in FIG. 1. In other words, the data signal processing circuit 5 calculates the jitter value based on a read data signal (RF signal) as the evaluation value calculating function. The jitter value calculated in this way is supplied to a system controller 10 as an evaluation value to be used for the operation of adjusting a focus bias and a spherical aberration correction value, which will be described later.

The RECD determining section 6 inputs a read data signal from the matrix circuit 4 and supplies a binary signal for determining the presence of recording to the system controller 10.

The binary signal for determining the presence of recording is used for the operation according to this embodiment, which will be described later.

The decoder section 7 demodulates the binary data string decoded by the data signal processing circuit 5. In other words, the decoder section 7 performs data demodulation, de-interleaving, ECC decoding, address decoding and so on. Thus, the decoder section 7 obtains readout data from the disk 50.

The data decoded to read data in the decoder section 7 is transferred to a host interface 8 and is transferred to a host machine 100 based on the instruction by the system controller 10.

The host machine 100 may be a computer apparatus or an AV (Audio-Visual) system machine, for example.

If the disk 50 is a writable disk, the ADIP information is processed when read.

In other words, the push-pull signal output from the matrix circuit 4 as a signal relating to the wobbling of a groove is handled as wobble data digitized by the wobble signal processing circuit 15. The PLL processing also generates a clock in synchronization with the push-pull signal.

The wobble data is MSK-demodulated or STW-demodulated by the ADIP demodulating circuit 16 to a data stream included in the ADIP address and is supplied to an address decoder 9.

The address decoder 9 decodes the supplied data and obtains and supplies the address value to the system controller 10.

The optical block servo circuit 11 generates focus, tracking and thread servo drive signals from the focus error signal FE and tracking error signal TE from the matrix circuit 4.

In other words, the optical block servo circuit 11 generates a focus drive signal and a tracking drive signal in accordance with the focus error signal FE and tracking error signal TE and drives the focus coil and tracking coil of the biaxial mechanism within the optical pickup 1. Thus, the tracking servo loop and focus servo loop are formed by the optical pickup 1, matrix circuit 4, optical block servo circuit 11 and biaxial mechanism.

The optical block servo circuit 11 turns off the tracking servo loop and outputs a jump drive signal in accordance with a track jump command from the system controller 10, whereby a track jump operation is performed.

Then, the optical block servo circuit 11 applies a focus bias to the focus servo loop in accordance with the instruction from the system controller 10.

The optical block servo circuit 11 further supplies a drive signal Sd for spherical aberration correction to a spherical aberration correction mechanism, which will be described later, included in the optical pickup 1 in accordance with the instruction from the system controller 10.

The optical block servo circuit 11 further generates a thread error signal obtained as a low frequency component of a tracking error signal TE or a thread drive signal under the access execution control from the system controller 10 and drives the thread mechanism 3 through the thread driver 19. The thread mechanism 3 has a mechanism including a main shaft holding the optical pickup 1, a thread motor and a transmission gear, not shown, and drives a thread motor in accordance with a thread drive signal, whereby the optical pickup 1 is slid in a predetermined manner.

A spindle servo circuit 12 controls the spindle motor 2 to perform CLV rotation.

The spindle servo circuit 12 obtains the clock generated by PLL signal on a wobble signal as the current rotational speed information of the spindle motor 2, compares it with predetermined CLV reference speed information and thus generates a spindle error signal.

Alternatively, when the disk 50 is a read-only ROM disk, the recovery clock generated by the PLL within the data signal processing circuit 5 is the current rotational speed information of the spindle motor 2. Therefore, by comparing it with predetermined CLV reference speed information, a spindle error signal can be also generated.

Then, the spindle servo circuit 12 outputs the generated spindle drive signal in accordance with the spindle error signal and causes the spindle motor 2 to perform CLV rotation through the spindle driver 17.

The spindle servo circuit 12 further generates a spindle drive signal in accordance with a spindle kick/brake control signal from the system controller 10 and causes the spindle motor 2 to operate an operation such as start, stop, acceleration or deceleration, for example.

Operations of the servo system and recording/reading system as described above are controlled by the system controller 10 including a microcomputer.

The system controller 10 performs processing in accordance with a command from a host machine 100 through a host interface 8.

For example, when the host machine 100 supplies a read command that requests the transfer of data recorded on the disk 50, the system controller 10 first performs seek operation control by handling the instructed address as a target. In other words, the system controller 10 instructs the optical block servo circuit 11 to perform an access operation to the optical pickup 1 by handling the address instructed by the read command as a target.

Then, operational control is performed, which may be required for transferring the data of the instructed data section to the host machine 100. In other words, the data is read out from the disk 50, and reproduction processing is performed in the data signal processing circuit 5 and the decoder section 7. Then, the requested data is transferred.

Having described the example in FIG. 1 in which a disk drive apparatus is connected to the host apparatus 100, a disk drive apparatus according to the invention may not be connected to other machines. In this case, an operating section and/or a display section may be provided therein, or the construction of the interface section for data input/output may be different from that in FIG. 1. In other words, a terminal section may be only required for reading in accordance with a user operation and for the input/output of data.

Figure 2:
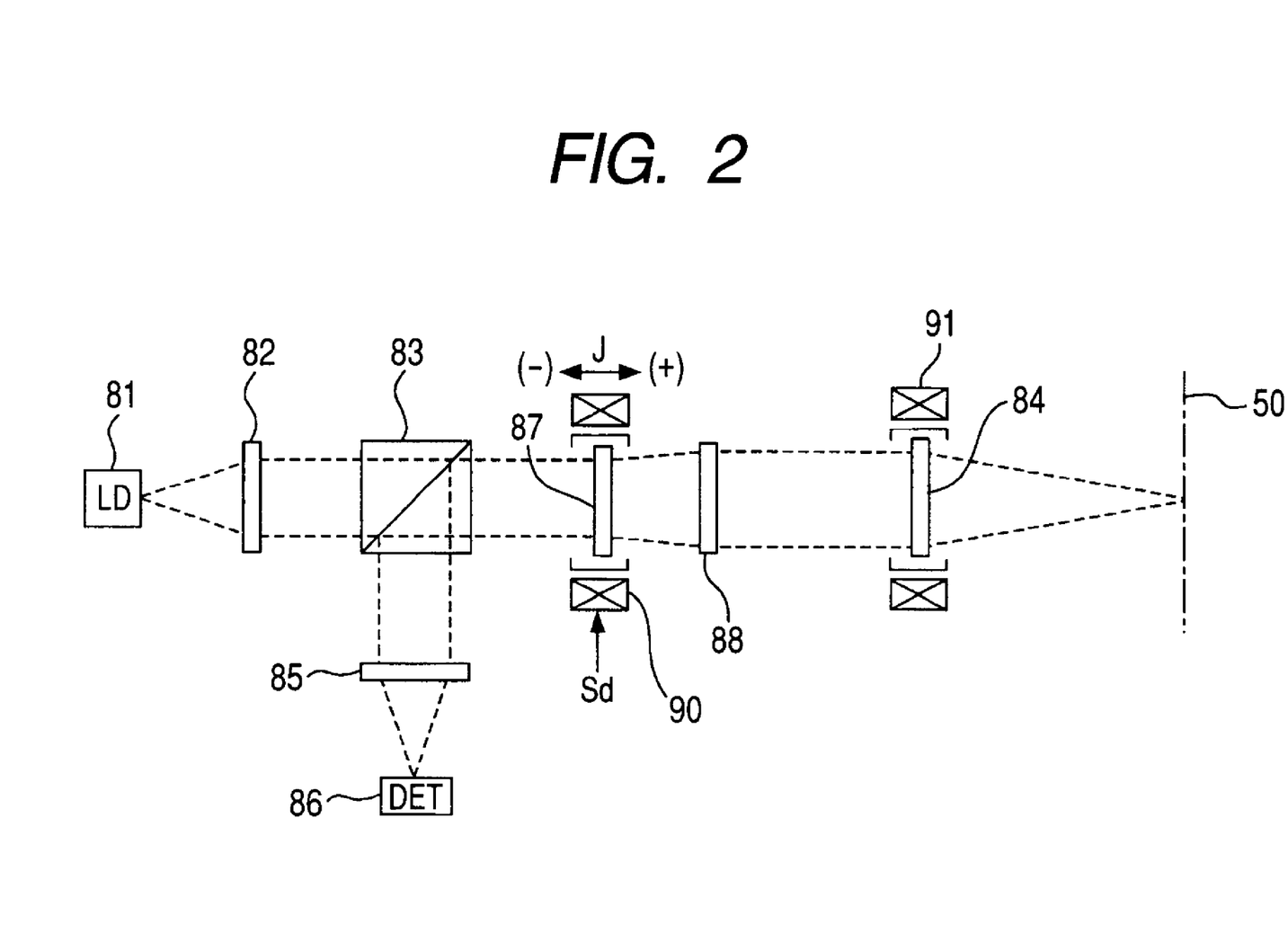
FIG. 2 is a diagram illustrating the construction of a spherical aberration correction mechanism included in the disk drive apparatus according to the embodiment.
Figure 3A:
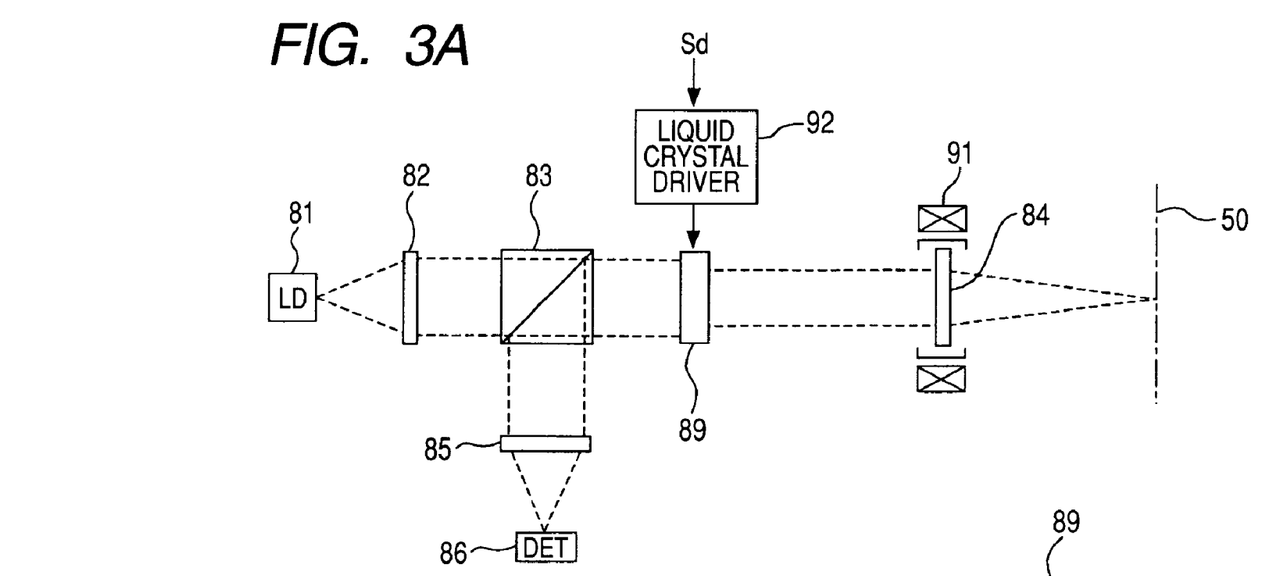
FIGS. 3A and 3B are diagrams illustrating the construction of the spherical aberration correction mechanism included in the disk drive apparatus according to the embodiment.
Figure 3B:
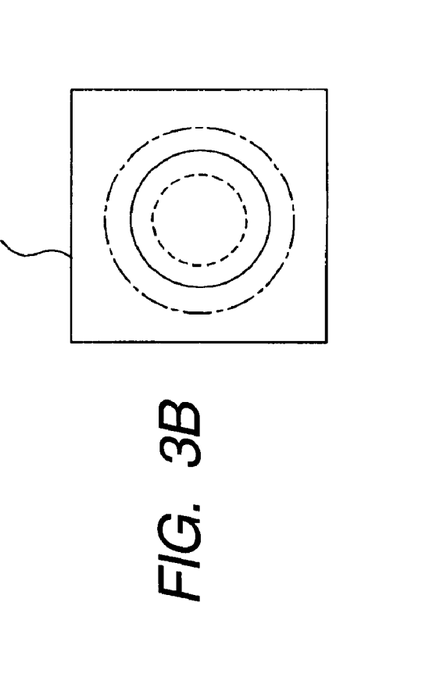

Next, FIGS. 2 and 3A and 3B show an example of the spherical aberration correction mechanism included in the optical pickup 1.

FIGS. 2 and 3A and 3B show the construction of the optical system within the optical pickup 1.

In FIG. 2, laser light output from a semiconductor laser (laser diode) 81 is transformed to parallel light by a collimator lens 82, passes through a beam splitter 83 and travels through a movable lens 87 and a fixed lens 88 in a spherical aberration correction lens group and irradiated from an objective lens 84 to the disk 50. The movable lens 87 and fixed lens 88 in the spherical aberration correction lens group are called expander. For this reason, the movable lens 87 and fixed lens 88 in particular may be notated as expander lenses 87 and 88.

The reflected light from the disk 50 is reflected by the beam splitter 83 through the objective lens 84, fixed lens 88 and movable lens 87 and is input to a detector 86 through a collimator lens (collector lens 85).

In the optical system, the objective lens 84 is supported movably in the focus direction and tracking direction by a biaxial mechanism 91, and focus servo and tracking servo operations are performed thereby.

The expander lenses 87 and 88 have a function of adjusting the diameter of laser light. In other words, the movable lens 87 is movable in a J-direction, which is the direction of optical axis, by an actuator 90. The movement can adjust the diameter of the laser light irradiated to the disk 50.

In other words, by controlling the actuator 90 to perform forward/backward movement, the spherical aberration correction can be implemented.

FIG. 3A shows an example in which a liquid crystal panel 89 is provided instead of the expander lenses 87 and 88 in the same optical system as that in FIG. 2 for spherical aberration correction.

In other words, in the liquid crystal panel 89, by adjusting the boundary between the area allowing laser light to pass through and the area that shuts off laser light as indicated by the solid line, broken like and dashed-dotted line in FIG. 3B, the diameter of the laser light can be adjusted. In this case, by controlling a liquid crystal driver 92 that drives the liquid crystal panel 89 to adjust the transparent area, the spherical aberration correction can be implemented.

Figure 4:
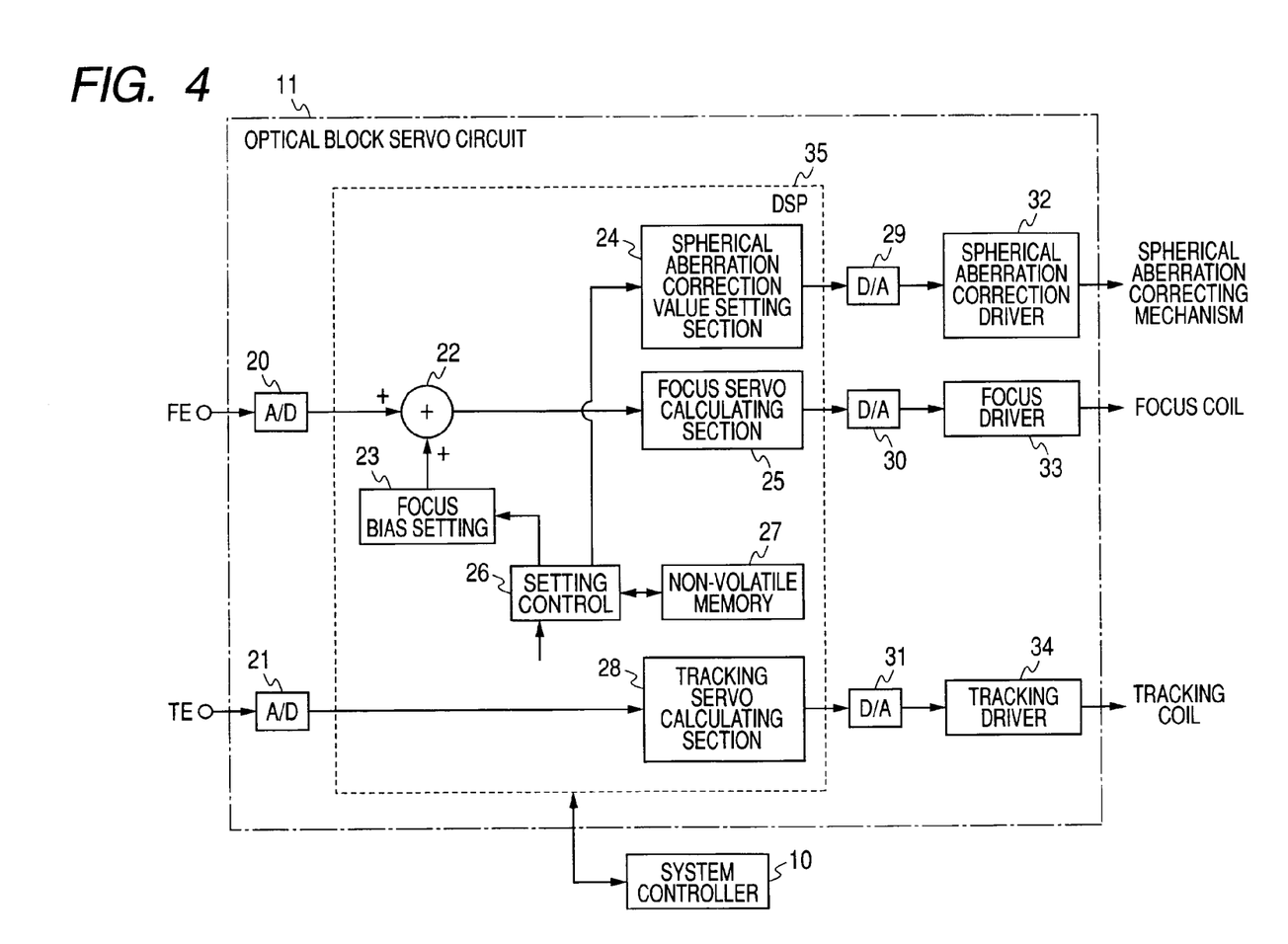
FIG. 4 is a block diagram showing an internal construction of an optical block servo circuit included in the disk drive apparatus according to the embodiment.

Next, FIG. 4 shows an internal construction of the optical block servo circuit 11 shown in FIG. 1.

In FIG. 4, the focus error signal FE and tracking error signal TE from the matrix circuit 4 shown in FIG. 1 are converted to digital data by A/D converters 20 and 21, respectively, and are input to a DSP 35 in the optical block servo circuit 11.

The DSP 35 has functions of a focus servo computing section 25 and a tracking servo computing section 28.

Then, the focus error signal FE from the A/D converter 20 is input to the focus servo computing section 25 through an adder 22.

The focus servo computing section 25 performs predetermined computing such as filtering and loop gain processing for phase compensation on the focus error signal FE input as digital data and generates and outputs the focus servo signal. The focus servo signal is converted to an analog signal by a D/A converter 30 (including PWM and PDM) and is input to a focus driver 33 to drive a focus actuator. In other words, current is supplied to the focus coil in the biaxial mechanism 91 holding the objective lens 84 in the optical pickup 1 to perform a focus servo operation.

The tracking servo computing section 28 performs predetermined computing such as filtering and loop gain processing for phase compensation, for example, on the tracking error signal TE input as digital data and generates and outputs a tracking servo signal. The tracking servo signal is converted to an analog signal by a D/A converter 31 (including PWM and PDM) and is then input to a tracking driver 34 to drive a tracking actuator. In other words, current is supplied to the tracking coil in the biaxial mechanism 91 holding the objective lens 84 in the optical pickup 1 to perform a tracking servo operation.

The DSP 35 has function sections for the addition of a focus bias, the setting of a spherical aberration correction value and the adjustment of a focus bias and a spherical aberration correction value.

The adder 22 adds a focus bias to a focus error signal FE. A proper focus bias value is added to a focus servo loop by outputting the focus bias value set by adjustment processing, which will be described later, by a focus bias setting section 23.

A spherical aberration correction value for a spherical aberration correction mechanism through a setting control section 26 is set in a spherical aberration correction value setting section 24. The set spherical aberration correction value is converted to an analog signal by a D/A converter 29 and is supplied to a spherical aberration correction driver 32.

The spherical aberration correction driver 32 in the spherical aberration correction mechanism as shown in FIG. 2, for example, is a circuit that supplies a drive signal Sd to the actuator 90 that moves the expander lens 87. Alternatively, in the spherical aberration correction mechanism using a liquid crystal panel as shown in FIGS. 3A and 3B, the spherical aberration correction driver 32 is a circuit that supplies, to a liquid crystal driver, a drive signal Sd that instructs the application of voltage to a necessary cell on the liquid crystal panel.

Therefore, the spherical aberration correction driver 32 is configured to drive the spherical aberration correction mechanism within the optical pickup 1 based on the spherical aberration correction value supplied from the spherical aberration correction value setting section 24.

A non-volatile memory 27 may store an initial value as a focus bias value or a spherical aberration correction value and may further store the adjustment values obtained by adjusting a focus bias and spherical aberration correction value, which will be described later, that is, an optimum focus bias and spherical aberration correction value.

The setting control section 26 sets the set value in the focus bias setting section 23 and the set value in the spherical aberration correction value setting section 24. For example, the setting control section 26 may set a value stored in the non-volatile memory 27 or change the set value or set values in accordance with the instruction from the system controller 10.

As described above, the focus servo computing section 25 and tracking servo computing section 28 in the DSP 35 and the operations relating to the adjustment of a focus bias and a spherical aberration correction value are controlled by the system controller 10.

In this embodiment, the construction of the disk drive apparatus described up to this point is for adjusting a focus bias and a spherical aberration correction value to optimum values.

An example of the adjustment operation to be performed in the disk drive apparatus according to this embodiment will be described below.

First of all, for performing the adjustment, a jitter value caused when the focus bias and spherical aberration correction value are changed is obtained. Then, the adjustment is performed by handling the jitter value as an evaluation value (evaluation signal).

In this example, the data read area for obtaining the jitter value for performing the adjustment is defined in an area called Pre-write Area on the disk 50.

Here, the Pre-write Area is an area to which data of All "0" is to be written (which will be called format hereinafter) when data is first written in a User Area (which is an area to which user data excluding management data is to be written) excluding a Lead-in Area and a Lead-out Area.

For this reason, some data has been to be written in the Pre-write Area even on the disk 50, which is a writable disk, if user data is recorded therein. Therefore, the data read area for performing the adjustment operation on a writable disk is defined within the Pre-write Area.

Notably, the area subject to data reading for calculating an evaluation value for adjusting a focus bias and a spherical aberration correction value is called "adjustment use range" in this specification.

The system controller 10 performs processing for adjusting a focus bias and a spherical aberration correction value as described later by handling the inside of the Pre-write Area as the adjustment use range.

In other words, the system controller 10 in this case first instructs the optical block servo circuit 11 to irradiate laser light of the optical pickup 1 to the adjustment use range of the disk 50. Then, the focus bias and spherical aberration correction value are defined based on the combination of the values at the first stage, and the set values are supplied to the setting control section 26 within the optical block servo circuit 11. For example, the values at the first stage of the focus bias and spherical aberration correction value may be set as FB-1 and SA-1, for example, here.

The read data signal obtained under the setting of the values FB-1 and SA-1 is supplied from the matrix circuit 4 to the data signal processing circuit 5. The data signal processing circuit 5 calculates the jitter value based on the read data signal. Then, the thus calculated jitter value is supplied to the system controller 10, and the system controller 10 stores the resulting jitter value in connection with the pair of the values FB-1 and SA-1 as set above.

The operation is repeated a total of 25 times with round-robin combinations of FB×5 stages (FB-1 to FB-5) and SA×5 stages (SA-1 to SA-5). Then, the system controller 10 stores the jitter values under the settings of the values based on the 25 combinations.

Then, the system controller 10 identifies the pair of the focus bias and spherical aberration correction value for obtaining the lowest jitter value, for example, among the stored jitter values. Then, the values of the identified focus bias and spherical aberration correction value are supplied to the setting control section 26 of the optical block servo circuit 11, and the focus bias setting section 23 and spherical aberration correction setting section 24 are instructed to set them. Thus, the focus bias and spherical aberration correction value are adjusted to have the values which may be considered as optimum.

By the way, having described that, in the disk drive apparatus of this embodiment, the adjustment operation is performed on the Pre-write Area as a target where data is necessarily to be written if data is already written even in a writable disk in the disk drive apparatus, the Pre-write Area may be possibly unformatted in which data is not written for some reason even if data is written in the User Area.

Therefore, no data may be recorded on both tracks adjacent to the adjustment use range to be read for adjusting a focus bias and spherical aberration correction value.

If no data is recorded on the tracks adjacent to the adjustment use range, the margin of jitter value with changes in focus bias and spherical aberration correction value tends to be relatively wide, as described in FIG. 7A. On the other hand, as shown in FIGS. 7B and 7C, if data is written on one or both tracks, the margin of jitter value tends to be relatively narrow.

In this way, if data is not been recorded on both tracks adjacent to the adjustment use range to be read for adjustment, the margin of jitter value tends to be relatively wide in comparison with the case when data is written on one or both of the tracks. Therefore, the precision for adjustment may lack if the adjustment is performed on such a place.

Accordingly, according to this embodiment, the adjustment operation as described above is performed only when data is recorded on at least one track adjacent to the adjustment use range.

Figure 5:
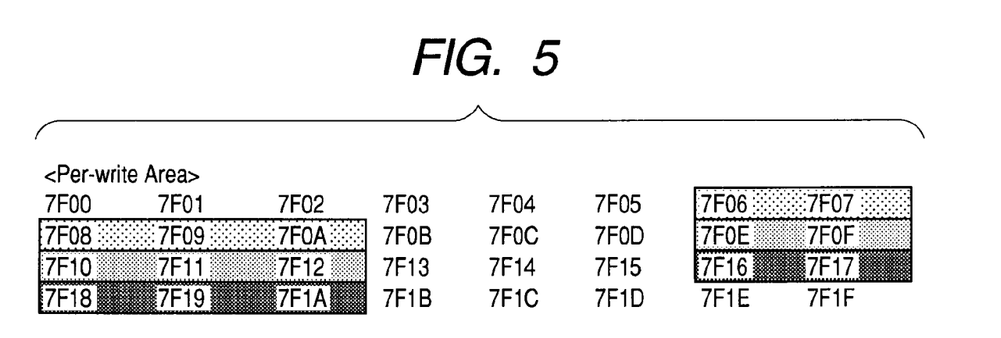
FIG. 5 is a diagram for describing an adjustment operation for a focus bias and a spherical aberration correction value according to the embodiment and shows a Pre-write Area on a disk by cluster addresses.

With reference to FIG. 5, the operation of this embodiment will be described below.

FIG. 5 is a diagram showing the Pre-write Area by cluster addresses.

In FIG. 5, the Pre-write Area includes a total of 32 RUBs (Recording Unit Blocks) from cluster addresses 7F00 to 7F1F as shown. The RUB is a recording unit of data, and one RUB includes one cluster. Data of 64 kilobytes can be recorded in one cluster.

Here, the Pre-write area is an area about 23.96 mm radius on the disk 50, and one orbit of the track is equal to two RUBs in the area.

In this embodiment, the area for one RUB is defined as the adjustment use range. More specifically, the shown 7F08, 7F10 and 7F18 are defined as the adjustment use range.

In this embodiment, a total of five RUBs (the area of which will be called block hereinafter) including the adjustment use range and the two RUBs before and after the range are defined as a read range for determining the presence of recording. In other word, the entire area of the block from the start address of the block to the last address of the block is read at a time, and the presence of recording is determined based on the result.

For example, in order to read the block with 7F06 as the start address in FIG. 5, the data reading is first started from 7F06. Then, the entire area of the block up to 7F0A, which is the last address of the block, is read at a time.

By thus reading one block from the beginning to the end, whether data is recorded at not only 7F08, which is the adjustment use range, but also 7F06, and 7F07 and 7F09 and 7F0A of the RUB before and after the adjustment use range or not can be determined at a time. In other words, whether data is recorded in the area of the half track of 7F08 and the whole of the both adjacent tracks of 7F06 and 7F07 and 7F09 and 7F0A or not can be determined.

In this way, by reading the data of the entire area of the block of five RUBs at a time, whether data is recorded on both tracks adjacent to the adjustment use range can be determined by one reading operation without reading and determining the data at 7F06 and 7F07 and 7F09 and 7F0A separately one by one, which is efficient.

However, since the Pre-write Area may be unformatted for some reason as described above, the block to be read for determining the presence of recording may be unformatted.

Accordingly, according to this embodiment, three blocks are defined, and if data is not recorded in one block, data is read from another block.

More specifically, the determination on the presence of recording is first performed on the block of 7F06 to 7F0A. Then, if it is determined that data is recorded in all of them, 7F08, which is the center RUB of the block, is defined as the adjustment use range. Then, the operation for adjusting a focus bias and a spherical aberration correction value as described above is performed on 7F08 as the target.

On the other hand, if it is determined that data is not recorded in the entire block of 7F06 to 7F0A, the determination on the presence of recording is performed on the next block of 7F0E to 7F12. If data is recorded in the entire block, 7F10, which is the center RUB, is defined as the adjustment use range. Then, the operation for adjusting a focus bias and a spherical aberration correction value as described above is performed on 7F10 as the target.

Then, if it is determined that data is not recorded in the entire block of 7F0E to 7F12, the determination on the presence of recording is performed on the last block of 7F16 to 7F1A. If data is recorded in the entire block, 7F18, which is the center RUB, is defined as the adjustment use range. Then, the operation for adjusting a focus bias and a spherical aberration correction value is performed on 7F18 as the target.

If it is determined that data is not recorded in the entire block of 7F16 to 7F1A, the adjustment use range is not defined, which prevents performing the adjustment operation.

The processing operation for implementing the operation according to the embodiment as described above will be described with reference to the flowchart in FIG. 6. The processing operation shown in FIG. 6 is performed based on a program stored in a ROM, for example, internally contained in the system controller 10.

Figure 6:
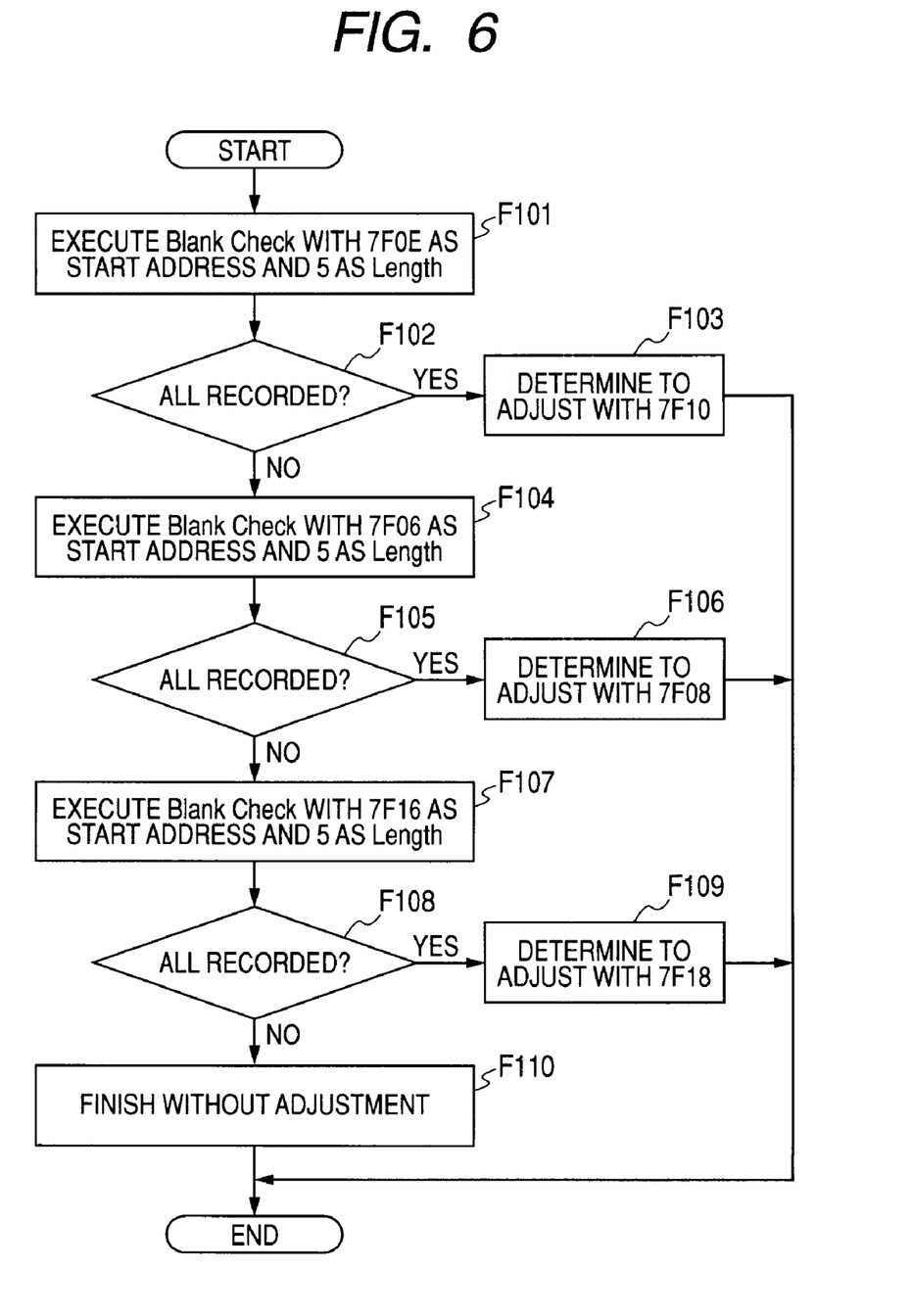
FIG. 6 is a flowchart showing a processing operation for implementing an operation according to the embodiment of the invention.

First of all, in step F101 in FIG. 6, Blank Check is executed with a start address at 7F0E and Length as 5.

In other words, the optical block servo circuit 11 is instructed to irradiate laser light of the optical pickup 1 to the start address (7F0E) first. In accordance with the instruction, a read data signal is supplied from the matrix circuit 4 to the RECD determining section 6, and the RECD determining section 6 outputs a binary signal for determining the presence of recording to the system controller 10. The system controller 10 performs checking processing on the presence of data recording based on the binary signals for five RUBs (corresponding to one block) from the start address, which are thus output from the RECD determining section 6.

Subsequently, in step S102, the processing of determining whether data is recorded entirely or not is performed.

In other words, based on the result of the checking processing in step F101 above, the processing of determining whether data is recorded entirely in one block with the start address as 7F0E or not is performed.

In step F102, if the positive result that data is recorded entirely in the one block with the start address at 7F0E is obtained, the processing moves to step F103 where the adjustment at 7F10 is determined.

In other words, the adjustment use range is defined (determined) at 7F10 for adjusting a focus bias and a spherical aberration correction value. Thus, during the operation of the adjustment of a focus bias and a spherical aberration correction value, the adjustment operation is performed on the RUB of 7F10 as a target.

If the negative result that data is not recorded entirely is obtained in step F102 above, the processing moves to step F104.

In step F104, Blank Check is executed with a start address at 7F06 and Length as 5.

The processing operation in step F104 is the same as the processing operation in step F101 described above except that the start address is 7F06.

Subsequently, in step F105, the processing of determining whether data is recorded entirely or not is performed.

In other words, based on the result of the checking processing in step F104 above, the processing of determining whether data is recorded entirely in one block with the start address at 7F06 or not is performed.

In step F105, if the positive result that data is recorded entirely is obtained, the processing moves to step F106 where the adjustment at 7F08 is determined.

In other words, the adjustment use range is determined at 7F10 for adjusting a focus bias and a spherical aberration correction value. Thus, during the operation of the adjustment of a focus bias and a spherical aberration correction value, the adjustment operation is performed on the RUB of 7F08 as a target.

If the negative result that data is not recorded entirely is obtained in step F105 above, the processing moves to step F107.

In step F107, Blank Check is executed with a start address at 7F16 and Length as 5. The processing operation in step F107 is the same as the processing operation in step F101 described above except that the start address is 7F16.

Subsequently, in step S108, the processing of determining whether data is recorded entirely or not is performed. In other words, based on the result of the checking processing in step F107 above, the processing of determining whether data is recorded entirely in one block with the start address at 7F16 or not is performed.

In step F108, if the positive result that data is recorded entirely is obtained, the processing moves to step F109 where the adjustment at 7F18 is determined. In other words, the adjustment use range is determined at 7F18 for adjusting a focus bias and a spherical aberration correction value. Thus, during the operation of the adjustment of a focus bias and a spherical aberration correction value, the adjustment operation is performed on the RUB of 7F18 as a target.

If the negative result that data is not recorded entirely is obtained in step F108 above, the processing moves to step F110.

In step F110, the processing ends without performing the adjustment.

Here, since it is determined that data is not recorded in some area within the Pre-write Area in the processing before step F110, this means that there is some unformatted part. Accordingly, in step F110, a message describing that the currently installed disk 50 is not formatted may be displayed on a display (not shown) such as a liquid crystal panel to notify the fact to a user.

As described above, according to this embodiment, the adjustment operation is performed if data is written in both tracks adjacent to the adjustment use range, and the adjustment operation is not performed if data is not written therein.

Thus, the adjustment operation can be performed only on the area where the margin of jitter value with changes in focus bias and spherical aberration correction value is relatively narrow. As a result, the adjustment of a focus bias and a spherical aberration correction value can be performed with higher precision.

Here, the processing operation by the system controller 10 shown in FIG. 6 may be performed immediately before the adjustment of a focus bias and a spherical aberration correction value or at a completely different time. For example, the RUB of the adjustment use range, which is determined by the processing operation in FIG. 6, may be held in advance, and the adjustment may be performed with the RUB of the adjustment use range.

Alternatively, the processing operation may be performed immediately after the disk 50 is installed in the disk drive apparatus according to this embodiment.

Having described the embodiment of the invention, the invention is not limited to the embodiment described above.

For example, in this embodiment, data in one block is read at a time, and whether data is recorded in the adjustment use range and both tracks adjacent thereto or not is determined. However, instead of this, data can be read from the adjustment use range and one track adjacent thereto in the block may be only read.

In this case, the processing operation shown in FIG. 6 may perform checking processing on the presence of recording of data based on the binary signals from three RUBs from the start address, for example, as the processing in steps F101, F104 and F107.

The other processing operation based on the check result may be the same as the processing operation shown in FIG. 6.

Alternatively, the adjustment use range and both tracks adjacent thereto may be read one by one separately.

In other words, when it is assumed that data is already written in the adjustment use range, the tracks on both sides of the adjustment use range may be read one by one to determine the presence of recording of data.

Alternatively, under the condition that data is recorded on one adjacent track, only a predetermined one track adjacent to the adjustment use range may be read.

Also in the variation examples above, the adjustment operation can be performed only when data is recorded on at least one track adjacent to the adjustment use range as a result. Therefore, the adjustment of a focus bias and a spherical aberration correction value can be also performed with higher precision.

Though, according to this embodiment, the jitter value with changes in focus bias and spherical aberration correction value are handled as an evaluation value for the adjustment, the invention is widely applicable also to the case where the adjustment is performed based on an evaluation value based on a read signal instead of the jitter value.

The adjustment use range from which data is read for adjusting a focus bias and a spherical aberration correction value is not limited to the inside of the Pre-write Area, but data may be read from other area excluding the inside of the Pre-write Area for adjusting a focus bias and a spherical aberration correction value.

Having described that the execution of the adjustment operation on a focus bias and a spherical aberration correction value is controlled based on the determination result on whether data is written on at least one track adjacent to the adjustment use range or not, a partial function of the adjustment operation may be controlled instead.

By controlling the adjustment operation based on the determination result on whether data is written on at least one track adjacent to the adjustment use range or not, the adjustment operation can be controlled in consideration of the characteristic of the evaluation value as shown in FIGS. 7A to 7C.

It should be understood by those skilled in the art that various modifications, combinations, sub-combinations and alterations may occur depending on design requirements and other factors insofar as they are within the scope of the appended claims or the equivalents thereof.

What is claimed is:

1. A disk drive apparatus comprising:
   head means for performing laser irradiation to and detection of reflected light from an optical disk recording medium in order to read data and having a focus bias mechanism for laser light and a spherical aberration correction mechanism;
   focus bias means for driving the focus bias mechanism to add a focus bias to a focus servo loop;
   spherical aberration correction means for driving the spherical aberration correction mechanism based on a spherical aberration correction value to perform spherical aberration correction;
   evaluation value creating means for creating an evaluation value functioning as an indicator of the quality of read signals based on reflected light information obtained by the head means;
   adjustment means for adjusting the focus bias and the spherical aberration correction value to optimum values based on the evaluation value created by the evaluation value creating means; and
   control means for determining whether data is written on at least one track of the tracks adjacent to an adjustment use range on the optical disk recording medium or not based on the reflected light information obtained by the head means and controlling an adjustment operation on the focus bias and the spherical aberration correction value by the adjustment means based on the determination result.

2. The disk drive apparatus according to claim 1, wherein the control means controls the execution of the adjustment operation by the adjustment means based on the determination result.

3. The disk drive apparatus according to claim 1, wherein the control means determines whether data is written on one of the tracks adjacent to the adjustment use range on the optical disk recording medium based on the reflected light information obtained by the head means.

4. The disk drive apparatus according to claim 1, wherein the control means determines whether data is written on both tracks adjacent to the adjustment use range on the optical disk recording medium or not based on the reflected light information obtained by the head means.

5. A method for adjusting a focus bias and a spherical aberration correction value in a disk drive apparatus having
   head means for performing laser irradiation to and detection of reflected light from an optical disk recording medium in order to read data and having a focus bias mechanism for laser light and a spherical aberration correction mechanism, focus bias means for driving the focus bias mechanism to add a focus bias to a focus servo loop, spherical aberration correction means for driving the spherical aberration correction mechanism based on a spherical aberration correction value to perform spherical aberration correction, evaluation value creating means for creating an evaluation value functioning as an indicator of the quality of read signals based on reflected light information obtained by the head means, and adjustment means for adjusting the focus bias and the spherical aberration correction value to optimum values based on the evaluation value created by the evaluation value creating means, the method comprising the step of:
   determining whether data is written on at least one track of the tracks adjacent to an adjustment use range on the optical disk recording medium or not based on the reflected light information obtained by the head means and controlling an adjustment operation on the focus bias and the spherical aberration correction value by the adjustment means based on the determination result.

6. A disk drive apparatus comprising:
   a head performing laser irradiation to and detection of reflected light from an optical disk recording medium in order to read data and having a focus bias mechanism for laser light and a spherical aberration correction mechanism;
   a focus bias section driving the focus bias mechanism to add a focus bias to a focus servo loop;
   a spherical aberration correction section driving the spherical aberration correction mechanism based on a spherical aberration correction value to perform spherical aberration correction;

an evaluation value creating section creating an evaluation value functioning as an indicator of the quality of read signals based on reflected light information obtained by the head;

an adjustment section adjusting the focus bias and the spherical aberration correction value to optimum values based on the evaluation value created by the evaluation value creating section; and a control section determining whether data is written on at least one track of the tracks adjacent to an adjustment use range on the optical disk recording medium or not based on the reflected light information obtained by the head and controlling an adjustment operation on the focus bias and the spherical aberration correction value by the adjustment section based on the determination result.

* * * * *